United States Patent [19]

Sharp

[11] Patent Number: 4,524,609
[45] Date of Patent: Jun. 25, 1985

[54] STORAGE TANK SYSTEMS

[76] Inventor: Bruce R. Sharp, 4090 Rose Hill Ave., Cincinnati, Ohio 45229

[21] Appl. No.: 580,800

[22] Filed: Feb. 16, 1984

Related U.S. Application Data

[63] Continuation-in-part of Ser. No. 544,012, Oct. 21, 1983, abandoned.

[51] Int. Cl.³ ............................................. G01M 3/32
[52] U.S. Cl. .................................... 73/49.2; 220/85 B
[58] Field of Search ............ 73/49.2, 49.3, 40, 40.5 R, 73/40.7; 340/605; 220/461, 85 B

[56] References Cited

U.S. PATENT DOCUMENTS 2,630,236 3/1953 Arkoosh .
2,884,978 5/1959 Grimm .
3,364,729 1/1968 Yearwood .
3,534,884 10/1970 Suter .
4,408,628 10/1983 Monk .............................. 73/49.2 X

FOREIGN PATENT DOCUMENTS 1150248 6/1963 Fed. Rep. of Germany ....... 73/49.2
2141041 2/1973 Fed. Rep. of Germany ....... 73/49.2
2311953 9/1974 Fed. Rep. of Germany ....... 73/49.3
2329525 1/1975 Fed. Rep. of Germany ....... 73/49.3

OTHER PUBLICATIONS

*Underground Leaks Alarm Industry*, in Petroleum Marketer, May–Jun. 1979, pp. 10–12.
*America Responds to Leaking Tanks; Rules Require Double Containment*, in Petroleum Marketer, Jul.–Aug. 1983, pp. 10–20.

Primary Examiner—Stewart J. Levy
Assistant Examiner—Joseph W. Roskos
Attorney, Agent, or Firm—Charles R. Wilson

[57] ABSTRACT

A storage tank system especially useful for storing liquid gasoline comprises a rigid outer tank fitted with a bladder and an analyzer. The system results in a storage facility which is less likely to lose its stored liquid to the environment due to a slow leak or a sudden large leak such as is possible with an earthquake.

28 Claims, 7 Drawing Figures

STORAGE TANK SYSTEMS

This is a continuation-in-part application of Ser. No. 544,012, filed Oct. 21, 1983, now abandoned.

This invention relates to liquid storage tank systems. More particularily the invention relates to storage tank systems having improved leak prevention means and leak detection means.

BACKGROUND OF THE INVENTION

Storage tanks are used throughout the world for storing various liquids in bulk form. In particular, storage tanks are used extensively for the storage of liquid gasoline at retail gasoline stations. Necessarily, these stations are in populated areas and therefore there is always a danger associated with leaks from the tanks. Leaked gasoline poses a hazard to the environment as well as an obvious health hazard. The known problem is particularily troublesome in that gasoline storage tanks are usually buried underground and any leaks which develop are normally very slow initially. This means that any leak which does start is difficult to detect until a substantial amount of gasoline has leaked. By that time environmental damage and possible health problems have occurred. The time and expense needed to clean up a gasoline spill can be enormous. It could involve initially emptying the storage tank and removing the emptied tank from the ground. The ground surrounding the tank would have to be decontaminated, a procedure which could be extensive in case of a slow leak which is not detected early or a sudden large leak. In addition to the expense of the above clean-up, there is the loss of profits due to the down-time involved not only with the damaged tank but also possibly the whole gasoline station. The health hazards associated with a gasoline spill can also be enormous in case of an accidental fire or drinking water contamination.

Use of conventional underground storage tanks is particularly troublesome in those areas that are prone to earthquakes. Typical underground storage tanks are constructed of metal or fiberglass. Any earthquake is likely to cause a crack in the tank with a consequent leak. If the leak is slow, the same problems as above discussed exists. If the leak is fast, the problem is readily detected, but only after it is too late to do anything about.

The problems associated with the present underground storage tanks are well known. Various attempts have been made to aleviate the problems. Several different types of leak detectors are presently being marketed in order to detect even slow leaks. A reliable leak detector would be of some value in that a leak which is detected early enough can be corrected. This may involve the emptying of the tank under controlled conditions and the repair of the tank. Such an operation would be expensive, however it would solve the problem. Another attempt to correct one of the problems has been the use of vault systems. That is, the rigid storage tank is surrounded by another rigid tank or shell which acts as an containment vessel if the storage tank developes a leak. This, of course, is quite expensive and economically lends itself only to tank systems which are being installed. It would be prohibitively expensive to uncover an existing storage tank and fit it with a rigid outer shell. Also, a problem still exists with any vault system in those areas that are prone to earthquakes. If the earthquake is severe enough, it would not only crack the storage tank but also the outer containment vessel.

There has now been discovered a liquid storage tank system which solves many of the problems inherent with the existing systems. The system of this invention is economical in that it can be installed in an existing underground storage tank as well as in new storage tanks about to be installed. The new system also eliminates the problem associated with the vaulted systems in that the new system is earthquake-proof.

SUMMARY OF THE INVENTION

The present invention is concerned with liquid storage tanks. The new system comprises (1) an outer tank shell having rigid walls with fill pipe, dispensing line and vent pipe (2) a bladder adapted to fit within the outer tank shell, (3) and an analyzer in communication with the space between the rigid walls of the outer tank shell and the bladder. In operation, gasoline is pumped into the bladder, which expands so as to substantially fill the confines of the outer tank shell. In certain of the embodiments of the invention, as gasoline is withdrawn from the bladder, the bladder collapses thereby eliminating the presence of gasoline vapors. Any leak which may occur in the bladder is contained within the outer tank shell and is detected by the analyzer.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention. Those liquids which are corrosive to the conventional steel and fiberglass tanks can make particular use of the storage tank system of this invention. Storage tanks other than underground storage tanks can also be utilized. However, the invention lends itself particularly well to underground tanks used for storing liquid gasoline and, therefore this preferred use is described in the following paragraphs. The system can be retrofitted to existing storage tanks or can be a part of any new installation.

Figure 1:
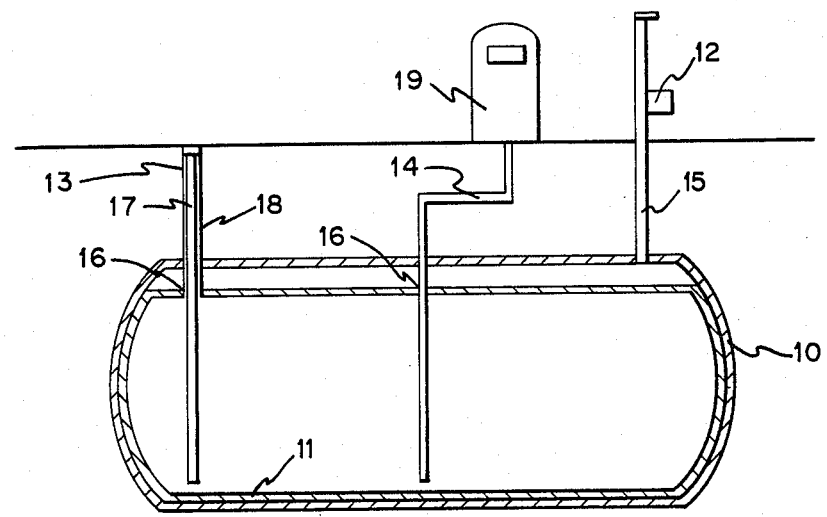
FIG. 1 is a side view, partially in section, of the improved liquid storage tank system when substantially filled.

With rerference to FIG. 1 the present invention comprises a rigid outer shell 10, a bladder 11 adapted to fit within the outer shell 10, and analyzer means 12. The rigid outer shell 10 is typically made of a metal such as steel or resin reinforced fiberglass. Such storage tanks are well known and are commonly used. Associated with the outer shell 10 are the fill pipe 13 communicating with the ground surface, dispensing line 14 for withdrawing gasoline and a vent pipe 15. Suitable openings in the outer shell 10 are provided for sealed intrusion or connection of the aforementioned pipes and line.

A bladder 11 is constructed of a flexible material of sufficient strength and impermeability to contain the gasoline. The bladder can be made of a material such as rubber, e.g. Buta-n, neoprene, fluoroelastomer, e.g. Viton, polyurethane polyester, polyethylene, polypropylene, fabric backed sheets of any of the foregoing materials as well as bladders constructed of two or more of the foregoing materials. The use of those materials whose resistance to gasoline is not sufficient is possible provided a second material which is gasoline impermeable is used on the side of the bladder which comes in contact with the stored gasoline. For example, fluoroelastomer coated polyethylene bladder is very useful because of the gasoline resistance offered by the fluoroelastomer and the strength and economy offered by the polyethylene. The listed materials used in construction of the bladder are not all inclusive, but only illustrative of some of the materials that can be used. Most importantly, the bladder is constructed of at least one material that is impermeable to the gasoline being stored and at the same time has sufficient strength to contain its contents.

It will be appreciated that the bladder is flexible so that when it is being emptied it collapses upon itself. Accordingly, substantially no air space exists above the liquid fuel, thereby minimizing the formation of gasoline vapor. This in itself is a savings in that such vapors are normally eventually lost to the atmosphere. As the bladder is emptied it collapses upon itself and lies upon the bottom of the storage tank. When it is refilled the bladder expands. The shape of the bladder is such that a filled bladder substantially fills the confines of the outer shell. The flexible nature of the bladder also allows for the easy installation in an existing tank system.

The bladder is provided with openings 16 for communication with the fill pipe 13 and dispensing line 14. The fill pipe provides as its obvious function the means by which gasoline can be pumped into the bladder from an outside source, e.g. a transport tank truck. As illustrated in FIG. 1 fill pipe 13 comprises a line 17 through which gasoline flows to the bladder and a space 18 within the fill pipe which acts as a vapor recovery line. As gasoline is pumped into the bladder, gasoline vapors which are formed are sucked through the space 18 back to the tank truck for recovery. This reduces the amount of gasoline vapors which would otherwise be vented to the atmosphere or remain in the bladder preventing the bladder from being filled completely with gasoline. As used throughout here the term "fill pipe" connotes the pipe by which gasoline is pumped to the bladder; it can be a single pipe, but more often has vapor recovery means associated with it and is often referred to as a vapor recovery fill line. The method by which the bladder is attached to the fill pipe or to the tank shell at the point where the fill pipe enters is not important to the invention herein. Thus, any means suitable for providing a sealed connection between the bladder 11 and the fill pipe 13 and/or tank shell 10 can be used. As shown in FIG. 1, line 17 entends into the bladder 11 with its end near the bottom of the storage tank. In this embodiment, suitable clamp means are used at the bladder opening for ensuring that liquid or vapor gasoline does not escape into the confines of the outer tank shell. Suffice it to say, the connection must be strong enough to withstand the constant filling and emptying of the bladder.

A second opening 16 in the bladder 11 is provided for the dispensing line 14 to withdraw liquid gasoline and deliver it to the consumer through gasoline dispenser 19. While not illustrated in FIG. 1, a pump is positioned within the bladder, dispensing line or gasoline dispenser for pumping gasoline to the dispenser. As with the fill pipe, means are provided for a sealed connection between the opening 16 in the bladder 11 and the dispensing line 14 or the tank shell 10 at the point where the dispensing line 14 enters. The bottom of the dispensing line 14 is in close proximity with the bottom of the bladder 11.

The vent pipe 15 associated with the outer shell is not in communication with the bladder 11. Rather the vent pipe as illustrated in FIG. 1 provides (1) means by which air escapes from the outer tank shell during a filling operation and (2) a means for detecting any leakage of the gasoline being stored within the bladder. That is, if the bladder developes a leak the gasoline will escape into the outer shell and become vaporized. The vapors will be transferred to the vent pipe and the analyzer 12 installed with the vent pipe 15 or in communication therewith will detect the presence of the gasoline vapors. In normal operation wherein the bladder is not leaking, only air will be vented out the vent pipe during a filling operation of the bladder. Preferably, alarms means are associated with the analyzer so as to alert an attendant to any leakage.

Several different analyzers are available on the market and can be used herein. Such analyzers are capable of selectively detecting gases such as gasoline vapors. An analyzer which is also capable of detecting liquid gasoline or water is also useful, especially in those areas of the country where gasoline vapors formed during the dispensing operation must be transported back to the storage tank. Such vapors could be returned to the bladder or the space between the bladder 11 and interior walls of the tank shell 10. In the latter case, the analyzer associated with the space must be capable of detecting only liquid gasoline. Detection of water at a certain level would indicate a leak in the outer shell and seepage of ground water into the tank.

Figure 2:
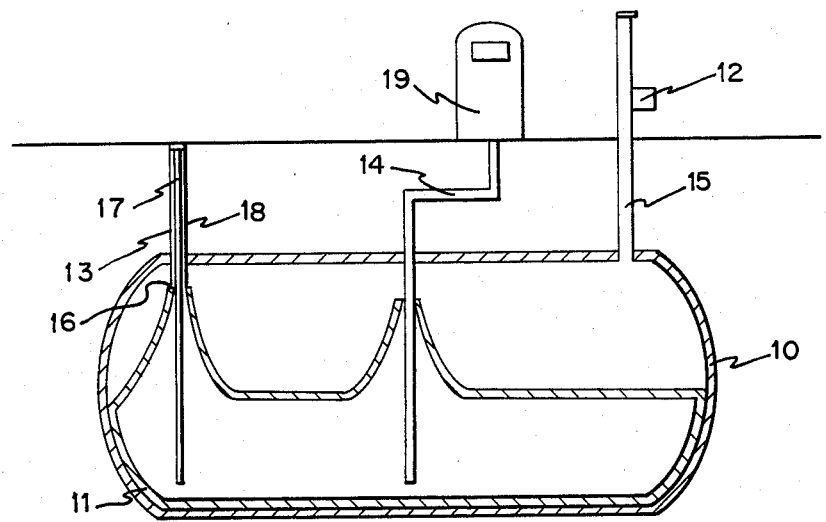
FIG. 2 is another side view of the system shown in FIG. 1 when the tank is almost empty.

FIG. 2 shows the same system as FIG. 1 wherein the bladder has been substantially emptied of gasoline. The bladder 11 has collapsed upon itself thereby minimizing air space within the bladder. This is desired since there is a lesser chance for gasoline vapors to form and be wasted to the atmosphere. Additionally, there will be a lesser chance for moisture condensation to occur in the bladder since the air space has been reduced. This is particularly desireable with the increasingly popular gasoline/methanol blends because water in the blend can cause a phase separation of the methanol from the gasoline. The methanol/water phase will fall to the bottom of the tank with a consequent change in the gasoline's carefully formulated composition.

Figure 3:
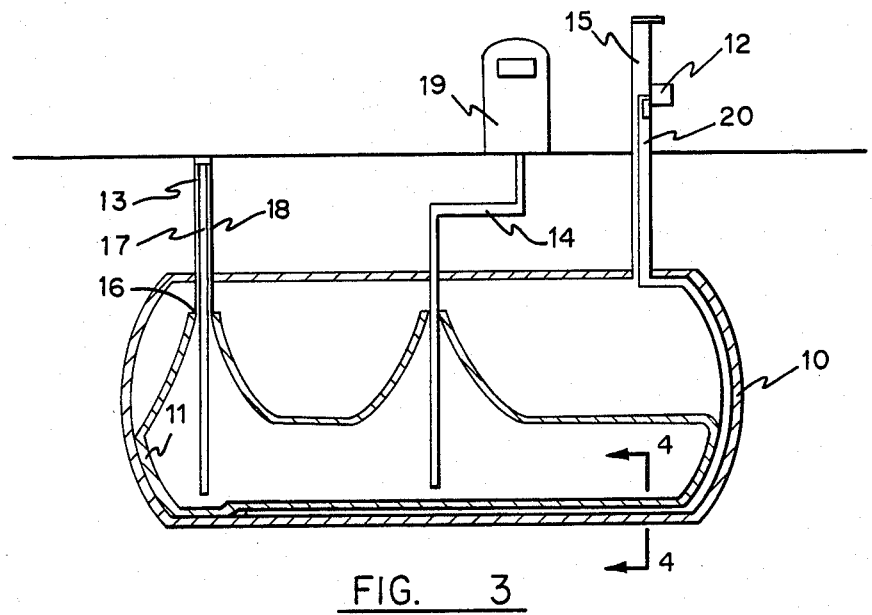
FIG. 3 is a side view, partially in section, of a preferred embodiement of the invention showing a means useful in the analysis of the contents of the outer tank shell.
Figure 4:
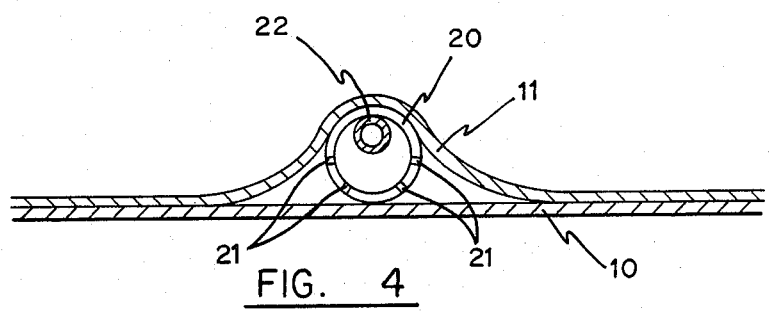
FIG. 4 is a horizontal cross-section view taken along lines 4—4 of FIG. 3.

In a preferred embodiment of the invention, illustrated in FIG. 3 and FIG. 4, the system is equipped with means for forcing vapor and/or liquid contents found in the outer tank shell into the vent pipe for ready analysis. Thus, with reference to FIGS. 3 and 4, a pipe 20 extends into the tank shell to the bottom of the outer tank shell 10 (either through the opening provided for the vent pipe 15 or its own opening) and then extends horizontally across the bottom of the tank shell. The bladder 11 rests on top of the pipe 20. The portion of the pipe 20 lying on the bottom of the tank has holes 21 in it for allowing any leaked gasoline from the bladder or water seepage from outside the tank shell to enter. A second pipe 22 associated with pipe 20 is capable of supplying air pressure or vacuum for forcing any liquid (water or gasoline) or gasoline vapors which collects in the pipe 20 into the analyzer for analysis. While this feature is not necessary, it does provide for a more reliable analysis.

Figure 5:
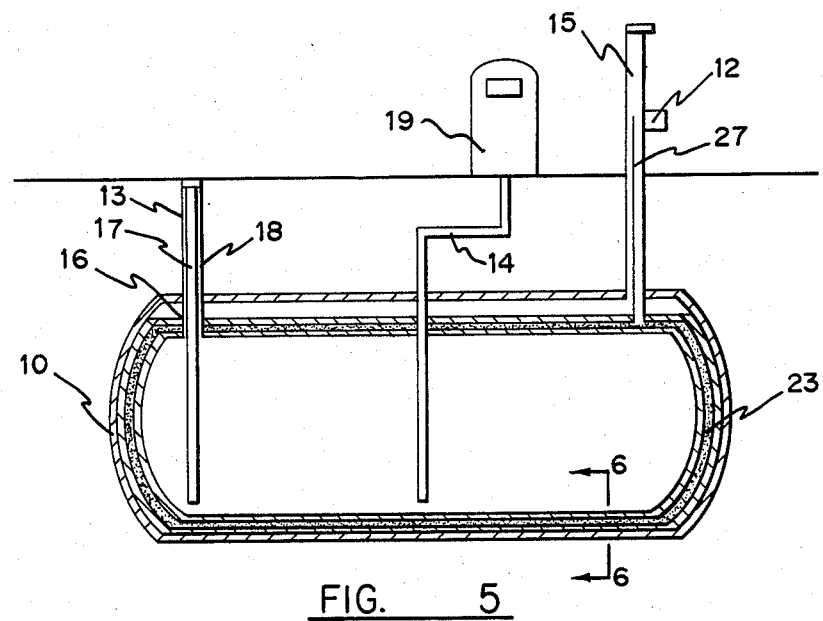
FIG. 5 is a side view, partially in section of another preferred embodiment of the invention showing a double walled bladder.
Figure 6:
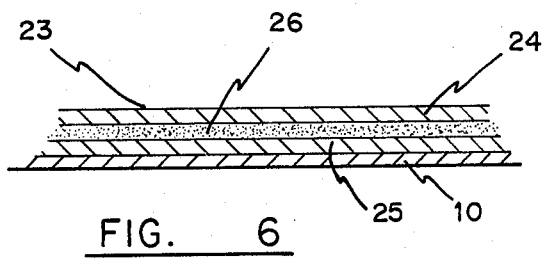
FIG. 6 is a horizontal cross-section view taken along lines 6—6 of FIG. 5.

Another preferred embodiment of the invention which provides for a fail-safe operation is illustrated in FIG. 5 and FIG. 6. In this storage tank system the rigid outer tank shell 10 contains a double walled bladder 23. The double walled bladder 23 as shown in FIG. 6 is comprised of an inner bladder 24, an outer bladder 25 and, optionally, means 26 positioned between the two bladders to maintain a spaced relationship. The bladders can be fabricated from the same material or materials described above. Each bladder can be of the same material or each be constructed of a different material. The space between the two bladders is monitored for leakage of gasoline through the inner bladder 24. This monitoring can be accomplished by different methods. In one method, the space between the two bladders is filled with a detecting fluid, e.g. water. If a leak developes in either the inner or outer bladder, the detecting fluid will drain from the space or become contaminated with gasoline. In either event, the change can be visually observed; as shown in FIG. 5, a line 27 extending through the vent pipe 15 and in communication with the space between inner bladder 24 and outer bladder 25 also contains detecting fluid. The analyzer 12 in this event is a sight glass for observing the change. Alternatively, where freezing is a problem in winter months, air pressure or a vacuum is maintained above the detecting fluid in the line 27. In this event, the analyzer 12 is a pressure change detector.

Another method for monitoring the closed space between the two bladders is to maintain an air pressure or vacuum in the space. In this method, the line 27 is also maintained under the air pressure or vacuum and the analyzer 12 is a pressure change detector or a gasoline (liquid or vaporous) analyzer. The means 26 shown in FIGS. 5 and 6 is used for maintaining a spaced relationship between the two bladders when vacuum is used. The means 26 is a gas permeable material, for example a foraminous or open-pore material such as jute, polyurethane foam, fiberglass matting, nylon matting and asbestos which will keep the two bladders apart, but will also permit a gas to be drawn through it.

Fill line 13, dispensing line 14 and gasoline dispenser 19 together with openings 16 in the bladder function the same as discussed previously with references to FIGS. 1-3.

The advantage of the double bladder embodiment of the invention is that it provides another measure of protection against gasoline leakage and can be considered a fail-safe design. Thus the outer bladder provides the primary containment of a gasoline leak while the outer tank shall provides secondary containment of the gasolien leak. The system is fail-safe because if a leak in the inner bladder 24 does develope, the analyzer 12 will detect it and alert the gasoline station operator to the problem before any damage can occur (even if the outer tank shell itself also had earlier suffured structural damage which had gone unnoticed). It is the early detection of leaked gasoline plus the primary leak containment provided by the outer bladder 25 and the secondary containment provided by the outer tank shell 10 which results in a fail-safe system. Also the means by which the system can be continuously monitored further contributes to the fail-safe design.

In the double bladder embodiment a second analyzer can be used for monitoring the space between the interior walls of the outer tank shell and the exterior of the double bladder. Preferably, the second anlyser would be monitoring water seepage through the walls of the outer tank shell or liquid gasoline and would use the system illustrated in FIGS. 3 and 4. However, the second analyzer for this purpose would only be useful where the water table is sufficiently high enough.

Figure 7:
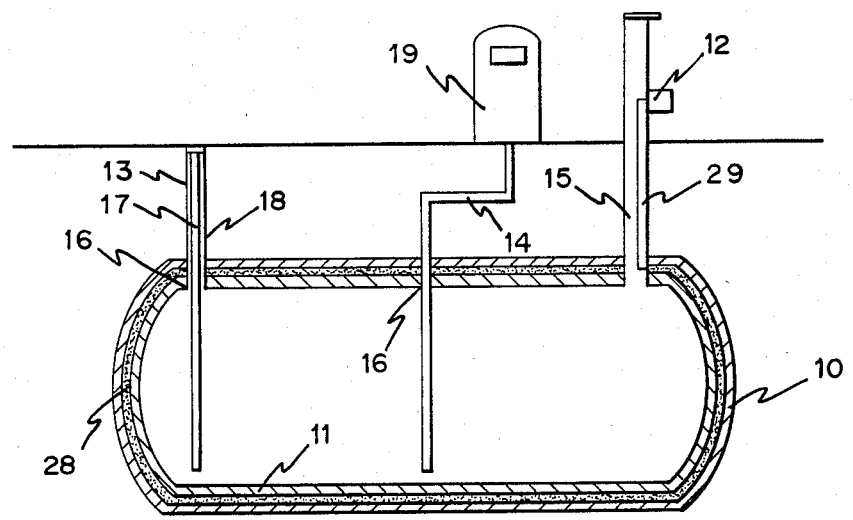
FIG. 7 is a side view, partially in section, of an embodiment of the invention wherein the bladder is held in place by means of vacuum.

In still another embodiment of the invention, the bladder is not intended to collapse. As shown in FIG. 7, a bladder is installed in a rigid outer tank shell with a gas permeable material 28 between it and the tank shell. The gas permeable material can be the same as that described with reference to FIGS. 5 and 6. The fill pipe 13 and dispensing line 14 fulfill their functions in a manner as described above with the other embodiments. However, vent pipe 15 extends through the bladder 11 to communicate with the bladder's interior. A vacuum line 29 depicted as being positioned within the vent pipe 15 communicates with the space occupied by the gas permeable material 28. A vacuum is drawn so that the bladder is held against the outer tank shell's walls, i.e. it does not collapse upon itself as gasoline is withdrawn. The analyzer 12 analyzes the gaseous material withdrawn by the vacuum line for possible gasoline leakage from the bladder into the outer tank shell. The main advantage that this embodiment of the invention enjoys is it is readily adapted to existing storage systems. Thus the fill pipe and vapor recovery means presently being used would still function the same with this embodiment. The gas permeable material and bladder can be readily installed in a buried storage tank. Means sould be used to secure the bladder to the various lines and pipes to ensure the bladder does not completely collapse in case of a vacuum lost. As with the other embodiments, the analyzer can periodically or continuously monitor the vacuum line's contents and be constructed to set off an alarm in case of an abnormal reading.

Preferably, adhesive means are used to bond the gas permeable material to the walls of the outer tank shell and/or the bladder for ease of installation of the total system. As used herein, "adhesive means" is used to broadly describe many bonding techniques. For example, adhesives commercially available for bonding together two or more substrates can be used. Also, when existing tanks are given a lining for either repair or protective purposes, a resinous coating is applied in one or more applications. The resinous coating prior to hardening can be used as the adhesive means for bonding the gas permeable material to the walls of the outer tank shell. This latter described embodiment of the invention is particularly attractive to those businesses which are concerned with the repairing or rejuvenating of existing storage tanks. Thus, a storage tank can be given sufficient applications of a liner material (generally a polyester or epoxy coating applied by spray) until the tank is repaired or rejuvenated. In the past, such a tank was then put back into operation. However, by this invention, the gas permeable material is applied while the last application of liner material is still in a tacky state. Thereafter, the bladder is installed. The resultant tank is now not only repaired or rejuvenated, but also has another means to contain the stored gasoline and has leak analysis capability-both features being a meaningful upgrading of the existing stoarage tank.

Still another embodiment, which is similar to that described immediately above, utilizes an adhesive to hold the flexible bladder to the walls of the rigid outer tank shell. Here, a probe is used between the bladder and the tank shell. The probe is capable of detecting gasoline and thus is considered an analyzer. The probe can be extensive enough to extend to the bottom and sides of the storage system. As with the embodiment depicted in FIG. 7, this embodiment is readily adapted to existing underground gasoline storage tanks.

In operation of the single bladder system described with reference to FIGS. 1 and 2, a gasoline transport tank truck will pump gasoline into the emptied bladder. The bladder will eventually be filled and take on the shape of the outer tank shell. Vapors which form within the bladder will be removed through the vapor recovery line. Subsequently, as gasoline is withdrawn through the dispensing line, the bladder will collapse upon itself. Essentially no air space will exist over the stored liquid gasoline. The analyzer monitors the space outside the bladder and inside the outer tank shell either continuously or periodically as desired. Preferably, for the continuous mode of operation, there are alarms means associated with the analyzer for alerting an attendant to any abnormal readings. Any leak of gasoline in the bladder will be contained within the outer shell and detected. Sufficient time will be available to repair the bladder since the outer tank shell will prevent any leakage to the surrounds. Similarly, if there is a leak in the outer tank shell (either small due to corrosion or large due to an abnormal occurrence such as an earthquake) the analyzer can be used to detect water. Since the bladder is flexible, even an earthquake should not effect it. After a detectable earthquake, there will be sufficient time to check for structural damage to the outer tank shell without a concern for any environment or health problem associated with a gasoline leak.

The operation of the double bladder system described with reference to FIGS. 5 and 6, is essentially the same as above described. However, in the double bladder system, the space between the two bladders is monitored for gasoline leaks. Also, the space between the inner walls of the outer tank shell and the double bladder can be used for vapor recovery from the dispensing operation; a second analyzer can monitor this space for water seepage or liquid gasoline.

Operation of the system described with reference to FIG. 7 is very similar to existing systems as far as the filling, dispensing and vapor recovery steps. However, a vacuum is maintained in the space between the bladder and outer tank shell. The contents of that space is analyzed for gasoline leakage through the bladder. Any bladder damage can be repaired; in the meantime the outer tank shell contains the gasoline. The flexible nature of the bladder allows it to withstand an earthquake.

What is claimed is:
1. A liquid storage tank system comprising:
  (a) an outer tank shell having rigid walls fitted with a fill pipe, a dispensing line and a vent pipe;
  (b) a bladder adapted for fitting within the outer tank shell to hold the liquid, said bladder having openings with means for sealed connection with the fill pipe, dispensing line and vent pipe or points at which the fill pipe, dispensing line and vent pipe enter the outer tank shell;
  (c) gas permeable material positioned between the bladder and the walls of the outer tank shell;
  (d) vacuum means in communication with the space occupied by the gas permeable material; and
  (e) an analyzer in communication with the space within the inner walls of the rigid tank shell and the outside of the bladder.

2. The liquid storage tank system of claim 1 wherein the analyzer is a gas analyzer and is capable of detecting selected gases which are withdrawn by the vacuum means.

3. The liquid storage tank system of claim 2 wherein gasoline is stored and the analyzer is capable of detecting gasoline vapors.

4. The liquid storage tank system of claim 1 wherein the analyzer is a liquid analyzer.

5. The liquid storage tank system of claim 1 wherein the analyzer has means associated with it to set off an alarm when a selected gas or liquid is detected.

6. The liquid storage tank system of claim 5 wherein the bladder is formed of a flexible material.

7. The liquid storage tank system of claim 6 wherein the bladder is formed of a fluoroelastomer material.

8. The liquid storage tank system of claim 7 wherein the bladder is a fluoroelastomer coated material.

9. The liquid storage tank system of claim 1 wherein the fill pipe and/or dispensing line extends into the bladder and clamp means are provided for securely attaching the openings in the bladder to the fill pipe and/or dispensing line.

10. The liquid storage tank system of claim 1 wherein the gas permeable material is jute, polyurethane foam, fiberglass matting. nylon matting or asbestos.

11. The liquid storage system of claim 10 wherein adhesive means are used to bond the gas permeable material to the outer tank shell and/or the bladder.

12. The liquid storage system of claim 11 wherein the adhesive means is a resinous liner material which when hardened forms a coating capable of repairing or rejuvenating the tank shell.

13. A fail-safe liquid storage tank system based on a double walled bladder, comprising:
  (a) an outer tank shell having rigid walls fitted with a fill pipe, a dispensing line and a vent pipe;
  (b) a double walled bladder adapted for fitting within the outer tank shell comprising an inner bladder to hold the liquid and an outer bladder encasing the inner bladder, said bladders having openings with means for sealed connection with the fill pipe and dispensing line or points at which the fill pipe and dispensing line enter the outer tank shell; and
  (c) an analyzer in communication with the space between the two bladders.

14. The liquid storage tank system of claim 13 wherein the space between the two bladders contains a detecting fluid and the analyzer is capable of detecting a change in level of detecting fluid or the presence of stored liquid.

15. The liquid storage tank system of claim 14 wherein the detecting fluid fills the space between the bladders and air pressure or a vacuum is maintained in a line communicating between the detecting fluid and the analyzer with said analyzer being capable of detecting a change in pressure.

16. The liquid storage tank system of claim 13 wherein the space between the two bladders is maintained under air pressure or a vacuum.

17. The liquid storage tank system of claim 16 wherein the analyzer is capable of detecting a pressure change.

18. The liquid storage tank system of claim 16 wherein the analyzer is capable of detecting gasoline.

19. The liquid storage tank system of claim 16 wherein the space between the two bladders is maintained under a vacuum and a gas permeable material is used to maintain a spaced relationship.

20. The liquid storage tank system of claim 19 wherein the gas permeable material is jute, polyurethane foam, fiberglass matting, nylon matting or asbestos.

21. The liquid storage tank system of claim 13 wherein a second analyzer monitors the space between the interior walls of the outer tank shell and the double bladder.

22. The liquid storage tank system of claim 21 wherein the analyzer in communication with the space between the two bladders monitors the space for gasoline vapors and the second analyzer monitors for water and/or liquid gasoline.

23. The liquid storage tank system of claim 13 wherein the bladders are formed of a flexible material.

24. The liquid storage tank system of claim 23 wherein the bladders are formed of a fluorelastomer material.

25. A liquid storage tank system utilizing a probe for detecting leakage, comprising:
(a) an outer tank shell having rigid walls fitted with a fill pipe, a dispensing line and a vent pipe;
(b) a bladder adapted for fitting within the outer tank shell to hold the liquid, said bladder having openings with means for sealed connection with the fill pipe and dispensing line or points at which the fill pipe and dispensing line enter the outer tank shell and wherein the bladder is adhesively bonded to the walls of the outer tank shell; and
(c) a probe positioned between the inner walls of the outer tank shell and the outside of the bladder, said probe being capable of detecting selected gases and/or liquids.

26. The liquid storage tank system of claim 25 further wherein the bladder has an opening through which the vent pipe extends and means are provided for a sealed connection with the vent pipe or point at which the vent pipe enters the outer tank shell.

27. The liquid storage tank system of claim 25 wherein the bladder is formed of a flexible material.

28. The liquid storage tank system of claim 27 wherein the bladder is formed of a fluoroelastomer material.

* * * * *